United States Patent [19]

Annas et al.

[11] Patent Number: 4,740,174

[45] Date of Patent: Apr. 26, 1988

[54] DEAD END TENSION CLAMP FOR OPTICAL GROUND WIRE

[75] Inventors: Nick S. Annas, Red Hook; John G. Torok, Fishkill, both of N.Y.

[73] Assignee: Fargo Mfg. Company, Inc., Poughkeepsie, N.Y.

[21] Appl. No.: 910,533

[22] Filed: Sep. 23, 1986

[51] Int. Cl.[4] .......................................... H01R 13/627
[52] U.S. Cl. .................................. 439/359; 439/785; 439/801; 439/804
[58] Field of Search ............... 339/47, 48, 14 R, 14 L, 339/92, 94, 241–244, 246–249, 263, 265, 266, 270, 273 R, 108, 109, 110

[56] References Cited

U.S. PATENT DOCUMENTS

| 2,858,516 | 10/1958 | Lindahl et al. | 339/246 |
| 2,885,653 | 5/1959 | Bethea et al. | 339/243 |
| 3,419,844 | 12/1968 | Schmued | 339/92 R |

FOREIGN PATENT DOCUMENTS

| 648761 | 9/1962 | Canada | 339/242 |
| 656527 | 1/1963 | Canada | 339/109 |
| 2825344 | 12/1979 | Fed. Rep. of Germany | 339/92 M |

Primary Examiner—Gil Weidenfeld
Assistant Examiner—David Pirlot
Attorney, Agent, or Firm—Kane, Dalsimer, Sullivan, Kurucz, Levy, Eisele and Richard

[57] ABSTRACT

A tension clamp adapted for mounting electrical and communications cables is provided. A flexible elongated C-shaped bail member is connected to a first clamp body portion on one end and a second clamp body portion on the other end. The clamp portions are plate-like and have opposing faces defining a cable recess therebetween. Bolts connecting the first and second body portions may be laterally translated out of grooves in one of the body portions to permit relative lateral translation of the body portions, without disconnecting the bail from the body portion, and enabling side mounting of a cable therewithin.

7 Claims, 3 Drawing Sheets

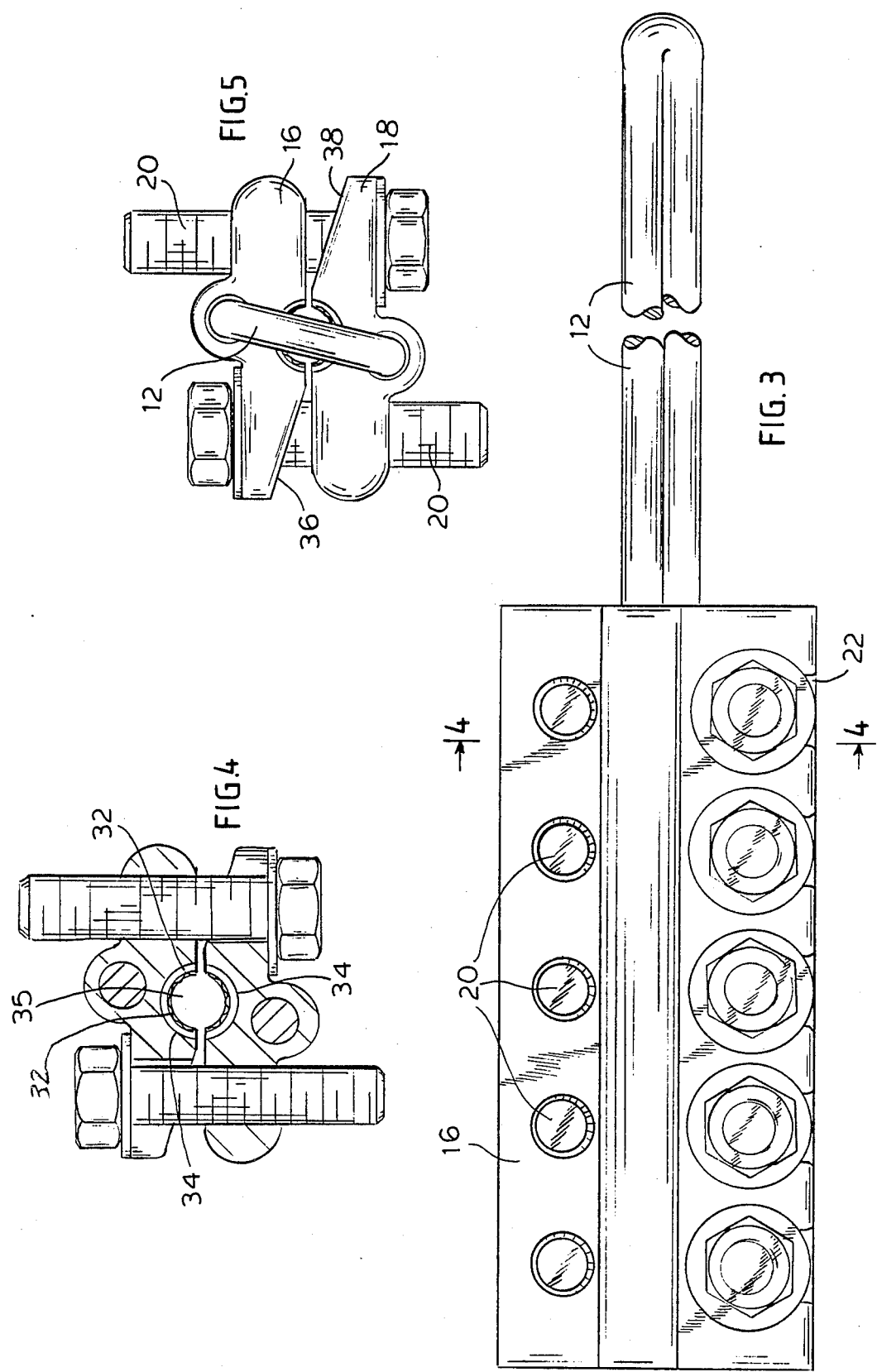

DEAD END TENSION CLAMP FOR OPTICAL GROUND WIRE

FIELD OF THE INVENTION

The present invention pertains to a tension clamp, for mounting electrical or communications cables, particularly for use with an optical ground wire.

BACKGROUND OF THE INVENTION

Electrical transmission systems contain one or more ground wires strung between towers to protect the system from lightning strikes. These ground wires are usually attached to the uppermost extremities of the tower. Many utilities are now replacing the existing ground wire with optical ground wire to provide the additional function of communications transmission.

The splicing and dead-ending of the optical ground wire require not only restoration of the electrical and mechanical integrity, but also splicing of the optical fibers. Because splicing of optical fibers is complicated and delicate, it is usually performed at ground level at the base of the tower. Consequently, the optical ground wire will extend a great length (typically 100 ft. or more) from the tower side of the dead end in order to reach the ground for optical fiber splicing. Loading of the tension clamp is often performed by a workman situated so that only one hand is free. Therefore, a dead-ending means that provides side loading ability (as opposed to end loading or threading) has greater advantage during installation.

Prior cable clamp structures include a preformed wire dead end which includes a sturdy wire bar bolted to a support plate. This device has proven to be stiff and difficult with which to work. Other dead-end devices have met with the problem of requiring threading of the ground wire into the dead end, or full disassembly of the dead end and reassembly with the ground wire mounted therein.

As can be seen from the above, the art of dead-end tension clamp structures for optical ground wires is in the development stages and has a lack of designs adapted for mounting convenience combined with functional durability.

SUMMARY OF THE INVENTION

The primary object of the present invention is to provide a dead end tension clamp adapted for side loading using conventional hand tools. The tension clamp of the present invention is adapted for bail mounting on a tower, and mounting of cable in the body of the clamp with unprecedented ease.

From a performance standpoint, the tension clamp is constructed of an extruded metal body for strength and toughness as well as close dimensional control. This design provides a high clamping force with minimum cable distortion. Further, a wire mesh screen is mounted in the cable-receiving recess of the clamp for providing a high-strength, electrically conductive gripping means. The wire mesh is also instrumental in preventing fracturing of the aluminum-clad exterior steel strands while maintaining electrical grounding flow.

A still further object is to provide a clever bail and hinge combination to achieve the side-loading characteristic.

These and other objects and advantages will become apparent from the following detailed description, which is to be read in conjunction with the drawings.

BRIEF DESCRIPTION OF THE DRAWINGS

FIG. 3 is a top plan view of the clamp of FIG. 1.

FIG. 4 is a section view of the clamp taken along line 4—4 of FIG. 3.

FIG. 5 is an end view of the clamp of FIG. 1.

DETAILED DESCRIPTION OF THE PREFERRED EMBODIMENT

Figure 1:
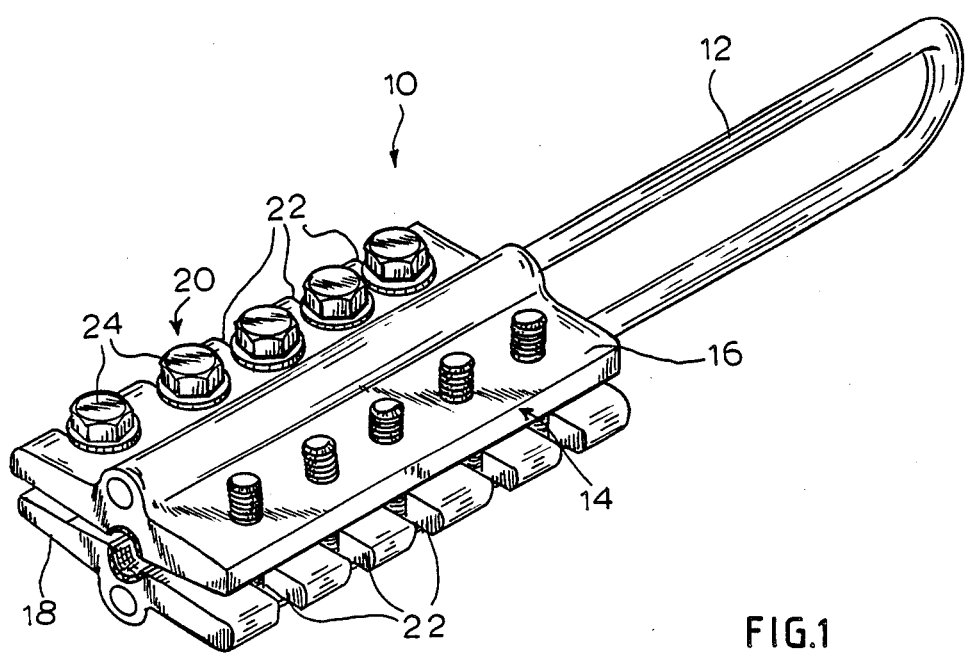
FIG. 1 is a perspective view of the dead end tension clamp of the present invention.

In FIG. 1 a clamp 10 is shown in perspective. An elongated bail 12, preferably composed of stainless steel, extends from a body 14, and is preferably threadingly engaged thereto. Bail 12 is adapted for convenient hanging or hooking onto a portion of a cable tower to support the body 14. The body comprises upper and lower sections 16 and 18 and is preferably composed of an extruded aluminum. The upper and lower sections may be identical in structure and facing each other in opposed relationship, as shown. Bolts 20 mounted in grooves 22 are set serially along first and second sides of body 14.

By way of background, the clamp of the present invention, although not limited to such use, is particularly adapted to use with optical ground wires which are either aluminum-clad, galvanized, aluminum alloy, or of a combined construction.

Figure 2:
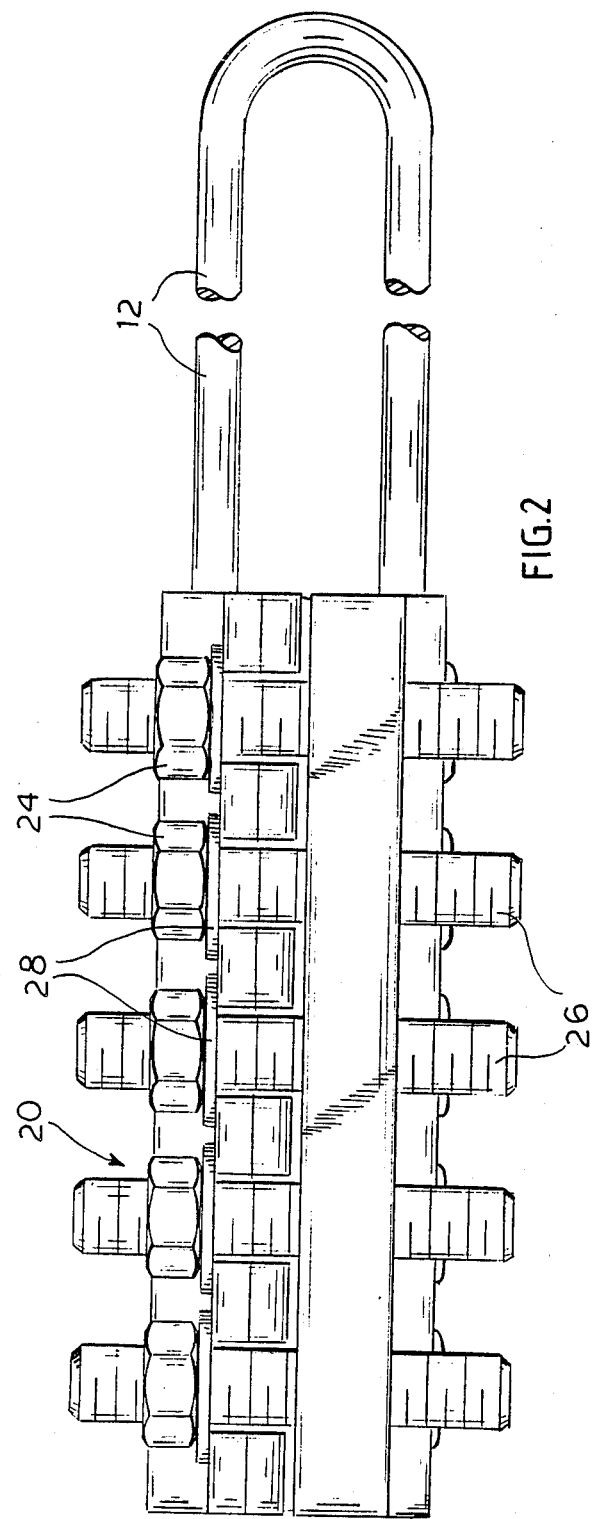
FIG. 2 is a side elevation view of the clamp of FIG. 1.

Referring now to FIG. 2, we see that the present embodiment includes five pairs of fastening bolts 20 each having a head 24 and a threaded shaft portion 26. Washers 28 are disposed between the bolt head and body 14. The threaded shaft portion 26 is adapted to threadingly engage with internally threaded receiving apertures in body 14. An O-ring composed of a resinous material may be placed on the threaded shaft portion 26 between the washer 28 and body 14.

In FIG. 3, a view from above, the slot-like configuration of grooves 22 (allowing lateral insertion of threaded shaft portion 26 into the groove) is shown.

From the section view of FIG. 4 we see wire mesh 32 mounted in cable recesses 34 of the upper and lower sections of body 14. Cable recesses 34 define a cylindrically-shaped cable opening 35. The wire mesh is preferably mounted in the form of a snap-in screen. An alternate mounting may be by epoxy bonding. The wire mesh screen provides a high strength, electrically conductive gripping means, while preventing fracture of cable strands secured therein.

FIGS. 4 and 5 highlight the structure of the upper and lower clamp sections 16 and 18 which adapts them to ease of cable installation. Both the upper and lower clamp sections contain opposing beveled edges 36 and 38 to facilitate relative lateral translation of the upper and lower sections 16 and 18 while providing clearance for insertion of a cable. Beveled edges 36 and 38 account for the limited translational movement available by stretching the relatively rigid, yet elastic bail member 12.

To load an optical ground wire into clamp 10, each bolt 20 is loosened until the end of the bolt is flush with the outside surface of the body portion into which it is threaded. With the bolts loosened, the body halves separate and the upper body half is laterally moved to the right, sliding along beveled edges 36 and 38, thus separating the body halves. Bail 12 is sufficiently flexible to permit dissociation of body halves without disconnecting the body halves from bail 12. A cable is then inserted between the body halves and mounted within cable opening 35. Screws 20 are then tightened to secure the cable to clamp 10.

For the manufacturer's benefit, a design is chosen which uses like components on both sides of the dead end. Component stocking, tooling and machine set-ups are kept to a minimum. Thus, an easy to install, one-piece unit is provided.

Although a detailed description of the invention is provided, it is to be understood that the scope of the present invention is not to be limited thereby but is to be determined by the claims which follow.

What is claimed is:

1. A dead end tension clamp for use in mounting metallic cables comprising:
   a bail having an elongated C-shape having a first end and a second end;
   a first body portion affixed to the first end and a second body portion affixed to the second end of the bail, the body portions each having a face on one surface, said faces facing each other, the faces of the body portions defining a longitudinal recess for receiving a cable therebetween, the first and second body portions having means for receiving bolts;
   a plurality of bolts coupling the first and second body portions and located on opposite sides of the longitudinal recess;
   wherein the means for receiving the bolts comprises a groove in one of the first and second body for each bolt, the groove permitting a bolt to be inserted therein from a side of the tension clamp, and wherein the bail is relatively rigid yet elastic permitting lateral translation of the body sections relative to one another to enable insertion of a continuous cable into the longitudinal recess.

2. A dead end tension clamp according to claim 1 wherein the first and second body portions each contain a beveled edge on opposing sides of the faces.

3. A dead end tension clamp according to claim 2 wherein the first and second body portions are plate-like members.

4. A dead end tension clamp according to claim 3 further comprising a wire mesh screen mounted within the longitudinal recess.

5. A dead end tension clamp according to claim 4 wherein the first and second body portions are identical in configuration.

6. A dead end tension clamp for use in mounting metallic cables comprising:
   a bail having an elongated C-shape having a first end and a second end;
   a first body portion affixed to the first end and a second body portion affixed to the second end of the bail, the body portions each having a face on one surface, said faces facing each other, the faces of the body portions defining a longitudinal recess for receiving a cable therebetween, the first and second body portions having means for receiving bolts;
   a plurality of bolts coupling the first and second body portions and located on either side of the longitudinal recess;
   wherein the means for receiving the bolts comprises a groove in one of the first and second body for each bolt, the groove permitting a bolt to be inserted therein from a side of the tension clamp, and wherein the bail is relatively rigid yet elastic permitting lateral translation of the body sections relative to one another to enable insertion of a continuous cable into the longitudinal recess;
   wherein the first and second body portions each contain a beveled edge on opposing side of the faces;
   wherein the first and second body portions are plate-like members further comprising a wire mesh screen mounted within the longitudinal recess;
   wherein the first and second body portions are identical in configuration; and
   wherein the first body portion contains said grooves on one side of the longitudinal recess and the second body portion contains said grooves on the opposing side of the longitudinal recess.

7. A dead end tension clamp according to claim 6 wherein the beveled edges of the first and second body portions are located on the other side of the longitudinal recess, on the respective body portion, from said grooves.

* * * * *